Oct. 20, 1925.                    1,558,275
J. PETERSON ET AL
DISPENSING RECEPTACLE
Filed July 21, 1924          2 Sheets-Sheet 1
Fig.1.                          Fig.2.
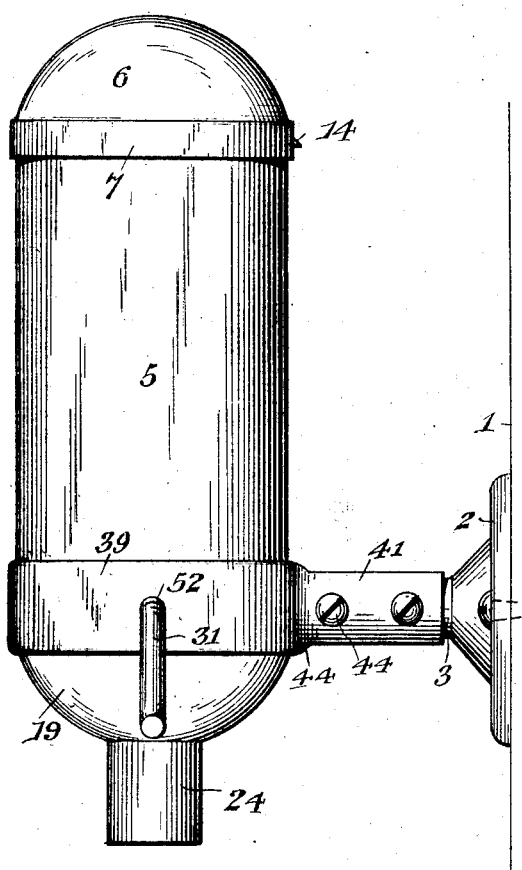
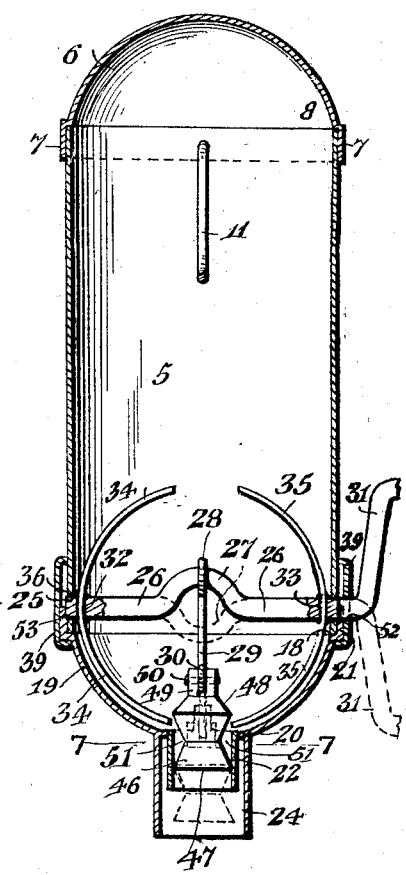
Fig.6.                          Fig.7.
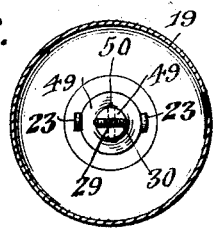
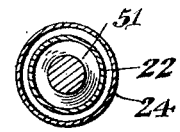
INVENTORS
John Peterson
G. G. Smith,
BY
Geo. P. Kimmel, ATTORNEY.

Oct. 20, 1925.
J. PETERSON ET AL
1,558,275
DISPENSING RECEPTACLE
Filed July 21, 1924
2 Sheets-Sheet 2
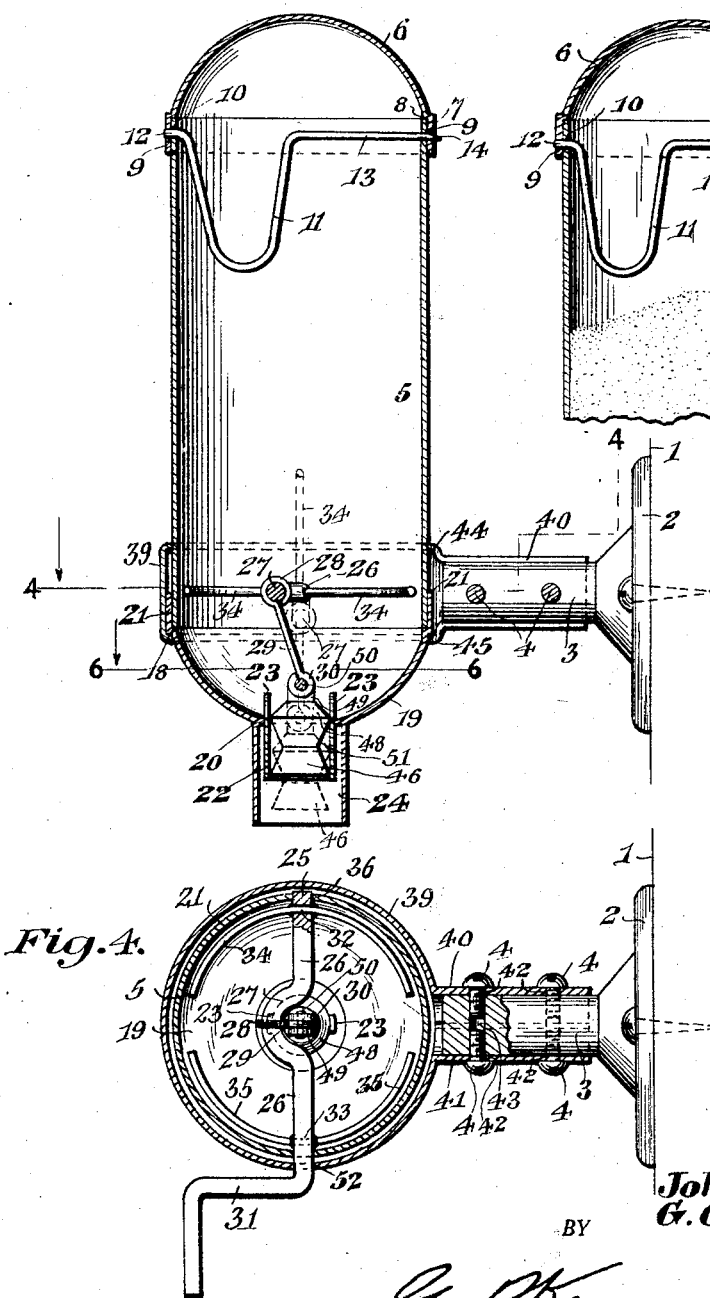
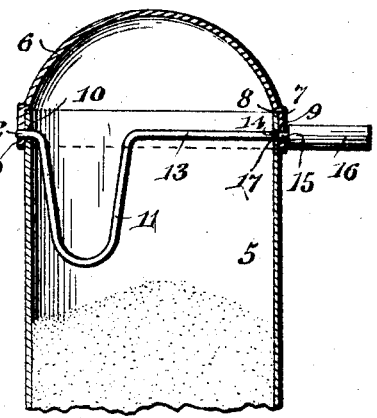
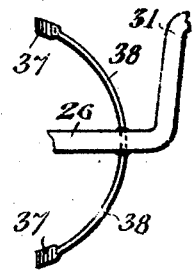
INVENTORS
John Peterson
G. G. Smith,
BY
Geo. P. Kimmel ATTORNEY.

Patented Oct. 20, 1925.

1,558,275

UNITED STATES PATENT OFFICE.

JOHN PETERSON AND GUSTAV G. SMITH, OF PORTLAND, OREGON.

DISPENSING RECEPTACLE.

Application filed July 21, 1924. Serial No. 727,246.

*To all whom it may concern:*

Be it known that we, JOHN PETERSON and GUSTAV G. SMITH, citizens of the United States, residing at Portland, in the county of Multnomah and State of Oregon, have invented certain new and useful Improvements in Dispensing Receptacles, of which the following is a specification.

This invention relates to dispensing receptacles, designed primarily for the dispensing of saponaceous powder, but it is to be understood that a dispensing receptacle in accordance with this invention can be employed for any purposes for which it is found applicable, and the invention has for its object to provide, in a manner as hereinafter set forth, a receptacle of the class referred to, having means to provide for the dispensing of the contents thereof in measured quantities.

A further object of the invention is to provide, in a manner as hereinafter set forth, a receptacle of the class referred to, having means to provide a dispensing element in the form of a valve, piston or plunger and means for protecting said element when the latter is shifted to dispensing position.

A further object of the invention is to provide, in a manner as hereinafter set forth, a receptacle of the class referred to, having a sectional container maintained and secured together in vertical position through the medium of an attaching member for connecting the receptacle to a support or wall bracket.

A further object of the invention is to provide, in a manner as hereinafter set forth, a receptacle of the class referred to, including a dispensing element for discharging the contents of the receptacle in measured quantities and further so constructed to receive by gravity, after being shifted from dispensing position, a measured quantity of the contents of the receptacle for dispensing purposes.

A further object of the invention is to provide, in a manner as hereinafter set forth, a receptacle of the class referred to, including a head member detachably connected, at two points, to the body portion of the receptacle, through the medium of a contractible resilient element disposed transversely of and projecting from the body portion.

A further object of the invention is to provide, in a manner as hereinafter set forth, a receptacle of the class referred to, including a dispensing element, a crank shaft for operating such element, and a pair of oppositely disposed agitating members carried by the crank shaft and operating synchronously when the dispensing element is shifted to and from dispensing position.

Further objects of the invention are to provide, in a manner as hereinafter set forth, a receptacle of the class referred to, which is simple in its construction and arrangement, strong, durable, compact, thoroughly efficient and convenient in its use, readily assembled and disassembled, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a dispensing receptacle in accordance with this invention and further illustrating the same, by way of example, detachably connected to a wall bracket.

Figure 2 is a vertical sectional view of a dispensing receptacle, in accordance with this invention.

Figure 3 is a vertical sectional view, taken at right angles to Figure 2.

Figure 4 is a section on line 4—4, Figure 3.

Figure 5 is a fragmentary view of the upper portion of the receptacle and further illustrating a key employed for releasing the head member from the body portion of the receptacle.

Figure 6 is a section on line 6—6, Figure 3.

Figure 7 is a section on line 7—7, Figure 2.

Figure 8 is a plan view illustrating a modified form of agitator.

Referring to the drawings in detail, 1 denotes a wall, to which is suitably secured a supporting bracket consisting of a base 2 and a stem 3, and said bracket is employed for supporting a dispensing receptacle in accordance with this invention, in a vertical position. The stem 3 is adapted to have detachably connected therewith, through the medium of the hold-fast devices 4, a dispensing receptacle in accordance with this invention.

A dispensing receptacle, in accordance with this invention, comprises a container consisting of a hollow body portion 5, which may be of any suitable contour, but preferably cylindrical, and mounted on and projecting from the top of the body portion 5 is a hollow semi-spherical head member 6, formed with an offset vertically disposed annular flange 7, which surrounds the periphery of the body portion 5 at the top thereof. The member 6 is seated on the top edge of the body portion 5, as indicated at 8. The flange 7 is formed with a pair of diametrically opposed openings 9, adapted to register with a pair of diametrically opposed openings 10, formed in the body portion 5, near the top edge thereof.

The head member 6 is detachably connected to the body portion 5, through the medium of a contractible resilient latching member formed from a length of spring wire of suitable gage, and which is formed with an intermediate V-shaped portion 11 and a pair of end portions 12 and 13. The end portions 12, 13, when the latching member is in operative position, extend through the aligning openings 9 and 10. See Figure 3. The end portion 12 is of less length than the end portion 13, and the outer terminus of the latter is bevelled, as at 14. When the head member 6 is detachably connected to the body portion 5, by the latching member, and it is desired to release the head member 6, a key consisting of a shank 15 and a handle 16 is employed for such purpose. The shank 15 has a flat end, as at 17, and when it is desired to release the head member 16, the flat end 17 of the shank 15 is inserted in that opening 9 in the flange 7 through which extends the flat end 14 of the end portion 13. The end portion 13 is then forced inwardly to contract the intermediate portion 11 of the latching member, until the end portion 13 clears the flange 7, or clears the latter and the body portion 5, and the head member 6 can then be removed. After the head member 7 has been removed, if the end portion 13 of the latching member is not positioned in the opening 10 through which it is to extend, it is then so positioned so that the bevelled end 14 thereof will project outwardly from the body portion 5. The head member 6 is then mounted on the end portion 12 of the latching member and when moved downwardly on that side of the body portion, opposes the side through which the end portion 12 extends, the head member will ride against the bevelled end 14 of the end portion 13 and the end portion 13 will eventually spring into position to extend through the flange 7. The setting up of the head member 6 detachably connected with the body portion 5 provides for the opening of the upper end of the body portion 5 for filling or other purposes.

Abutting against the lower edge 18 of the body portion 5, is a hollow semi-spherical bottom member 19, which at its lower end is formed with a centrally disposed opening 20 and at its upper end with an offset flange 21 which surrounds the periphery of the body portion 5, at the lower portion thereof. Formed integral with the edge of the opening 20, is a vertically disposed annular sleeve 22 of substantial length. Projecting upwardly from the top edge of the sleeve 22, as well as being connected thereto and diametrically opposed with respect thereto, is a pair of guide pins 23.

Depending from the lower face of the member 19, as well as surrounding and spaced from the sleeve 22, is a protecting member 24, in the form of a cylindrical shell and which is of a length to project a substantial distance below the lower edge of the sleeve 22. The function of the member 24 will be presently referred to.

The body portion 5, in proximity to the bottom edge thereof, is provided with a pair of diametrically opposed openings 25, through which extends a dispensing element operating shaft 26 provided centrally with a crank portion 27 having the upper end 28 of an actuating rod 29 pivotally connected therewith. The lower end of the rod 29 is pivotally connected, as at 30, to a dispensing element which will be presently referred to.

The shaft 26 has one end thereof extended and terminating in a crank handle 31 arranged exteriorly of the body portion 5. The shaft 26, in proximity to one of the openings 25, is formed with a slot 32 and in proximity to the other opening 25 provided with a slot 33. Extending through the slot 32 is an agitating member, in the form of a semi-circular bar 34, and extending through the slot 33 is an agitating member in the form of a semi-circular bar 35. The bars 34 and 35 are oppositely disposed with respect to each other and are so arranged that the termini of one bar will project towards the termini of the other bar. The bars 34 and 35 are secured, centrally of their ends, to the shaft 26, by soldering or otherwise, as indicated at 36. Each of the bars is of a length to extend in the member 19 when the shaft 26 is revolved. As the members 34 and 35 are fixedly secured to the shaft 26, they will perform their agitating function when the dispensing element is shifted to and from dispensing position.

Preferably the bars 34 and 35 are cylindrical throughout, but they can be of other contour and by way of example each terminal portion of each of the bars 34, 35, can be flattened, as indicated at 37, in Figure 8. The agitating member, which is flattened at its ends, is indicated in Figure 8 by the reference character 38.

The member 19 is detachably secured, to the lower end of the body portion 5, through the medium of an attaching member consisting of a split band 39 provided at its split ends with a pair of right angularly extending oppositely disposed semi-circular attaching arms 40, 41 and each of said attaching arms is provided with a pair of openings 42, which are adapted to register with the openings 43 formed in the stem 3. See Figure 4.

The top edge of the band 39 is provided with an inwardly extending annular flange 44, which abuts against the body portion 5 a substantial distance above the flange 21. The bottom edge of the band 39 is provided with an inwardly extending annular flange 45 which abuts against the periphery of the member 19 and engages the bottom edge of the flange 21. By this arrangement, when the attaching member is secured to the stem 3, the body portion 5 and member 19 are detachably secured in position, and further the receptacle is maintained in a vertical position.

The attaching arms 40 and 41 are detachably connected to the stem 3 by the holdfast devices 4, extending through the aligning openings 42 and 43 and threadedly engaging in the stem 3. See Figure 4.

The dispensing element, which is employed for dispensing the material from the receptacle in measured quantities, is in the form of a valve, plunger or piston and will be referred to as a valve as it not only performs the function of dispensing the material in measured quantities, but also acts as a closure for the member 19. The valve is indicated at 46, has a flat lower face 47 and a tapered extension 48 at its upper end and with said extension, at its top, formed with a pair of opposed spaced apertured ears 49, between which the lower end of the rod 29 is positioned. Extending through the ears 49 is a pin 50 for connecting the lower end of the rod 29 with the ears 49 and which provides the pivotal connection, as indicated at 30, between the actuating member or rod 29 and the valve 46. The body portion of the valve 46 gradually increases in diameter from its center towards the extension 48 and towards the lower face of the body portion thereof, thereby providing a valve body with an exteriorly arranged pocket 51 to receive the quantity of material which is to be dispensed. The valve 46 corresponds to the contour of the sleeve 22, and the upper and lower ends of the body portion of the valve 46 snugly engage the inner face of the sleeve 22 when the dispensing element is shifted to dispensing position, and, furthermore, the lower end of the valve 46 snugly engages the inner face of the sleeve 22 when the dispensing element is shifted to a position to receive a quantity of material to be dispensed. By this arrangement, the dispensing element will close the receptacle whether such element is in dispensing position or in a position to receive the material to be eventually discharged.

The band 39 is provided with an opening 52 for the passage of the shaft 26 and the flange 21 is reduced, as at 53, to provide a clearance for one end of the shaft 26.

The shell 24, which has been termed a protecting element, is employed to keep the powder from spreading when it is dispensed, and at the same time acts as a protector to prevent the contact of water with the dispensing element, as well as gives a more artistic appearance to the device.

The guides 23 act to keep the dispensing element in a vertical position at all times, more especially when said element has been shifted upwardly into the member 19, as illustrated in Figure 2, so that the material can be supplied to the pocket 51.

By revolving the shaft 26, the dispensing element is elevated into the member 19 to such an extent that the powder will fill the pocket 51, and on a further movement of the crank shaft, in the same direction, the dispensing element is forced downwardly a substantial distance below the lower end of the sleeve 22, permitting the powder to discharge from the pocket 51. Owing to the manner of setting up the dispensing element, it discharges a measured quantity of powder upon each operation. The amount can be increased or decreased, depending upon the size of the pocket 51. The dispensing element can also be made longer or shorter and under such conditions the measured quantity of powder would be reduced or increased. The sleeve 22 is of a length which will permit filling and discharging and at the same time the dispensing element will prevent any escape of the powder while the latter enters the pocket 51 or when the powder is discharged from the dispensing element. This makes what may be termed forced feed. In other words, the dispensing element and sleeve are so constructed that when the powder enters the pocket 51, it cannot escape and when the dispensing element is full of powder and lowered, the sleeve 22 is closed by the upper end of the dispensing element, thereby allowing only the amount of powder carried by the dispensing element to be discharged.

The agitators are so formed or shaped that they continuously agitate the powder at every turn or fraction of a turn of the shaft 26, and further, the said agitators act to fill the pocket 51 of the dispensing element.

The body portion and member 19 are detachably connected by the band 39, whereby it overcomes the necessity of employing screws or other means for connecting said body portion and member 19 together. The band not only performs the function referred to, but also acts as an attaching means in connection with the wall bracket for maintaining the receptacle in vertical position. If it is desired to disconnect the bottom 19 of the body portion 5, all that is required to do is to loosen two of the holdfast devices 4, which coact with an attaching arm and when the screws are loosened, the attaching arm can be shifted outwardly on the screws whereby the band is moved from clamping engagement with respect to the body portion 5 and member 19, and under such conditions the member 19 can be removed so that access can be had to the crank shaft, agitators and dispensing element.

A dispensing receptacle, in accordance with this invention can be made of any size or shape desired, and as it is constructed of metallic material, it is unusually durable, as well as strong, then further, one must be thoroughly familiar with the operation of the latching member before the head member 6 can be removed, then furthermore, the operation of the latching member can only be had from the rear of the receptacle.

It is thought that the many advantages of a dispensing receptacle constructed in accordance with this invention, can be readily understood, and although the preferred embodiment of the invention is as illustrated and described, yet changes in the details of construction can be had which will fall within the scope of the invention as claimed.

What we claim is:—

1. A dispensing receptacle comprising a vertically disposed container having an outlet in its bottom, a reciprocatory combined dispensing and closure valve for said outlet, a shaft mounted in the lower portion of and extending diametrically of said container and further operated exteriorly thereof, an actuating rod pivotally connected respectively to said shaft and valve for shifting the latter when the shaft is revolved, and a pair of oppositely disposed arc shaped agitators fixedly secured to opposed end portions of said shaft within said container, the ends of one of said agitators spaced from the ends of the other to provide a clearance for said rod.

2. A dispensing receptacle comprising a vertically disposed container having an outlet in its bottom, a reciprocatory combined dispensing and closure valve for said outlet, a shaft mounted in the lower portion of and extending diametrically of said container and further operated exteriorly thereof, an actuating rod pivotally connected respectively to said shaft and valve for shifting the latter when the shaft is revolved, and a pair of oppositely disposed arc shaped agitators fixedly secured centrally thereof to opposite end portions of said shaft in close proximity to the inner face of said container, the ends of one of said agitators spaced from the ends of the other to provide a clearance for said rod, said agitators so disposed with respect to each other whereby one will form a continuation of the arc of the other.

3. A dispensing receptacle comprising a container having an outlet in its bottom, a reciprocatory closure valve therefor, said valve provided with means intermediate its ends for receiving and dispensing successively measured quantities of the contents of the container, a guide sleeve for the valve, said sleeve depending from the bottom of the container and forming a continuation of said outlet, said sleeve acting in connection with the upper end of the valve to close the container when the valve is shifted below said outlet to dispense a portion of the contents of the container, a revolvable shaft extending diametrically of the lower portion of the container and operated exteriorly of the side of the latter, a pair of arc shaped, oppositely disposed agitators arranged within the container and fixed intermediate their ends to said shaft for bodily moving therewith, and an operative connection between the upper end of the valve and said shaft, said agitators extending in the same arc and spaced from each other to provide a clearance for said operative connection.

4. A dispensing receptacle comprising a container having an outlet in its bottom, a reciprocatory closure valve therefor, said valve provided with means intermediate its ends for receiving and dispensing successively measured quantities of the contents of the container, a guide sleeve for the valve, said sleeve depending from the bottom of the container and forming a continuation of said outlet, said sleeve acting in connection with the upper end of the valve to close the container when the valve is shifted below said outlet to dispense a portion of the contents of the container, an annular protective element depending from the bottom of the container and surrounding and spaced from said sleeve, said element depending below the lower edge of the sleeve and surrounding the lower end of the valve when the latter is in dispensing position, a revolvable shaft extending diametrically of the lower portion of the container and operated exteriorly of the side of the latter, a pair of arc shaped, oppositely disposed agitators arranged within the container and fixed intermediate their ends to said shaft for bodily moving therewith, and an operative connection between the upper end of the valve and said shaft, said agitators extending in the same arc and spaced from each other to provide a clearance for said operative connection.

5. A dispensing receptacle comprising a container having an outlet in its bottom, a reciprocatory closure valve therefor, said valve provided with means intermediate its ends for receiving and dispensing successively measured quantities of the contents of the container, a guide sleeve for the valve, said sleeve depending from the bottom of the container and forming a continuation of said outlet, said sleeve acting in connection with the upper end of the valve to close the container when the valve is shifted below said outlet to dispense a portion of the contents of the container, an annular protective element depending from the bottom of the container and surrounding and spaced from said sleeve, said element depending below the lower edge of the sleeve and surrounding the lower end of the valve when the latter is in dispensing position, and a pair of opposed vertical guide pins positioned within the container and extended upwardly from said sleeve.

6. A dispensing receptacle comprising a container having an outlet in its bottom, a reciprocatory closure valve therefor, said valve provided with means intermediate its ends for receiving and dispensing successively measured quantities of the contents of the container, a guide sleeve for the valve, said sleeve depending from the bottom of the container and forming a continuation of said outlet, said sleeve acting in connection with the upper end of the valve to close the container when the valve is shifted below said outlet to dispense a portion of the contents of the container, an annular protective element depending from the bottom of the container and surrounding and spaced from said sleeve, said element depending below the lower edge of the sleeve and surrounding the lower end of the valve when the latter is in dispensing position, valve operating means extending diametrically of and removably mounted in the lower portion of the container, said means being revolvable and projecting from the side of the container to permit of the manual operation of said means, and a pair of opposed vertical guide pins positioned within the container and extended upwardly from said sleeve.

7. A dispensing receptacle comprising a container including a body portion having a removable bottom formed with an offset flange at its top circumferentially extending around the lower part of said body portion, a split band for detachably connecting the container to a support, said band provided with an upper and a lower inwardly extending flange, the lower flange of said band engaging said bottom below the flange thereof, and the upper flange of the band engaging said body portion above the flange of the body.

8. A dispensing receptacle comprising a container including a body portion having a removable bottom formed with an offset flange at its top circumferentially extending around the lower part of said body portion, a split band for detachably connecting the container to a support, said band provided with an upper and a lower inwardly extending flange, the lower flange of said band engaging said bottom below the flange thereof and the upper flange of the band engaging said body portion above the flange of the body, said band including a pair of lateral attaching arms, means for detachably securing said arms to a support.

In testimony whereof, we affix our signatures hereto.

GUSTAV G. SMITH.
JOHN PETERSON.